(12) United States Patent
Suteerawanit

(10) Patent No.: US 10,595,524 B1
(45) Date of Patent: *Mar. 24, 2020

(54) TRACKING POWDER POISON STATION

(71) Applicant: Nick Suteerawanit, Los Angeles, CA (US)

(72) Inventor: Nick Suteerawanit, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/403,521

(22) Filed: May 4, 2019

Related U.S. Application Data

(63) Continuation-in-part of application No. 16/374,957, filed on Apr. 4, 2019.

(51) Int. Cl.
*A01M 25/00* (2006.01)
*A01M 31/00* (2006.01)

(52) U.S. Cl.
CPC ........ *A01M 25/004* (2013.01); *A01M 31/002* (2013.01)

(58) Field of Classification Search
CPC .............. A01M 25/002; A01M 25/004; A01M 31/002; A01G 31/002
USPC .......................................................... 43/131
See application file for complete search history.

(56) References Cited

U.S. PATENT DOCUMENTS

| | | | |
|---|---|---|---|
| 2,587,397 A | 2/1952 | Smith | |
| 2,588,894 A * | 3/1952 | Taff | A01M 1/223 43/112 |
| 3,225,485 A * | 12/1965 | Powell | A01M 23/00 43/131 |
| 3,603,022 A * | 9/1971 | Asher | A01M 1/24 43/131 |
| 4,186,512 A * | 2/1980 | Berg | A01M 1/223 43/112 |
| 4,281,471 A | 8/1981 | Jenkins | |
| 4,349,981 A | 9/1982 | Sherman | |
| 4,400,904 A * | 8/1983 | Baker | A01M 25/004 119/52.4 |
| 4,839,984 A * | 6/1989 | Saunders | A01M 1/223 43/112 |
| 4,869,015 A * | 9/1989 | Murakami | A01M 1/223 43/98 |
| 5,027,548 A | 7/1991 | Anderson | |

(Continued)

FOREIGN PATENT DOCUMENTS

| | | | |
|---|---|---|---|
| CA | 2825880 A1 * | 8/2012 | .......... A01M 25/004 |
| CA | 2931235 A1 * | 5/2015 | .......... A01M 25/004 |

(Continued)

*Primary Examiner* — Magdalena Topolski
*Assistant Examiner* — Morgan T Barlow
(74) *Attorney, Agent, or Firm* — Kenneth L. Green; Averill & Green

(57) ABSTRACT

A tracking powder poison station includes a housing, rodent entrances, a removable or opening, lockable housing front, contamination guards above the rodent entrances into the housing, and a removable tray. A bottom portion of the housing provides space for common bricks arranged end to end. A center portion of the housing provides space for the removable tray. A top portion provides space for rodent attracting material. Tracking powder is deposited in the tray for contact with rodents. Insecticide is deposited in insecticide troughs at ends of the tray aligned with the insect slots.

18 Claims, 4 Drawing Sheets

(56) References Cited

U.S. PATENT DOCUMENTS

| | | | |
|---|---|---|---|
| 5,301,458 A * | 4/1994 | Deyoreo | A01M 1/04 43/112 |
| 5,435,096 A * | 7/1995 | Nekomoto | A01M 1/223 43/112 |
| 5,930,944 A * | 8/1999 | Knuppel | A01M 1/026 43/114 |
| 6,588,141 B1 | 7/2003 | Bergeson | |
| 7,310,907 B2 | 12/2007 | Suteerawanit | |
| 8,028,468 B1 | 10/2011 | Walsh | |
| 8,578,649 B1 * | 11/2013 | Walsh | A01M 25/004 220/603 |
| 8,621,777 B2 | 1/2014 | Rivera | |
| 8,701,337 B2 * | 4/2014 | Kay | A01M 25/004 206/818 |
| 8,720,107 B1 * | 5/2014 | Vickery | A01M 1/106 43/107 |
| 8,793,929 B1 | 8/2014 | Walsh | |
| 8,984,802 B1 * | 3/2015 | Walsh | A01M 25/004 43/131 |
| 9,220,256 B2 * | 12/2015 | Walsh | A01M 23/30 |
| 9,258,991 B2 * | 2/2016 | Harper | A01M 25/004 |
| 9,532,564 B1 * | 1/2017 | Walsh | A01M 25/004 |
| 2002/0043018 A1 * | 4/2002 | Townsend | A01M 23/16 43/131 |
| 2007/0151142 A1 * | 7/2007 | Suteerawanit | A01M 1/106 43/122 |
| 2008/0072475 A1 * | 3/2008 | Nelson | A01M 25/004 43/131 |
| 2009/0077861 A1 * | 3/2009 | Stephens | A01M 25/004 43/131 |
| 2009/0229170 A1 * | 9/2009 | Gaibotti | A01M 25/004 43/131 |
| 2012/0204476 A1 * | 8/2012 | Frisch | A01M 1/023 43/114 |
| 2014/0283435 A1 * | 9/2014 | Galeb | A01M 23/005 43/107 |
| 2015/0257378 A1 * | 9/2015 | Zhang | A01M 1/2011 43/112 |
| 2015/0366210 A1 * | 12/2015 | Olson | A01M 1/026 43/112 |
| 2017/0079260 A1 * | 3/2017 | Hays | A01M 31/002 |
| 2018/0116202 A1 * | 5/2018 | Burger | A01M 25/004 |
| 2018/0325094 A1 * | 11/2018 | Dolshun | A01M 23/20 |
| 2019/0008131 A1 * | 1/2019 | Austin | A01M 1/026 |
| 2019/0037829 A1 * | 2/2019 | Laut | A01M 31/002 |
| 2019/0124913 A1 * | 5/2019 | Power | A01M 31/002 |
| 2019/0183126 A1 * | 6/2019 | Gries | A01N 45/00 |

FOREIGN PATENT DOCUMENTS

| | | | | |
|---|---|---|---|---|
| DE | 2448140 A1 * | 4/1976 | | A01M 1/06 |
| DE | 19544117 A1 * | 5/1997 | | A01M 1/2011 |
| DE | 202015002462 U1 * | 5/2015 | | A01M 25/004 |
| EP | 3456198 A2 * | 3/2019 | | A01M 23/24 |
| FR | 449427 A * | 2/1913 | | A01M 1/223 |
| WO | WO-2007123755 A2 * | 11/2007 | | A01M 23/38 |
| WO | WO-2012120263 A1 * | 9/2012 | | A01M 25/004 |

* cited by examiner

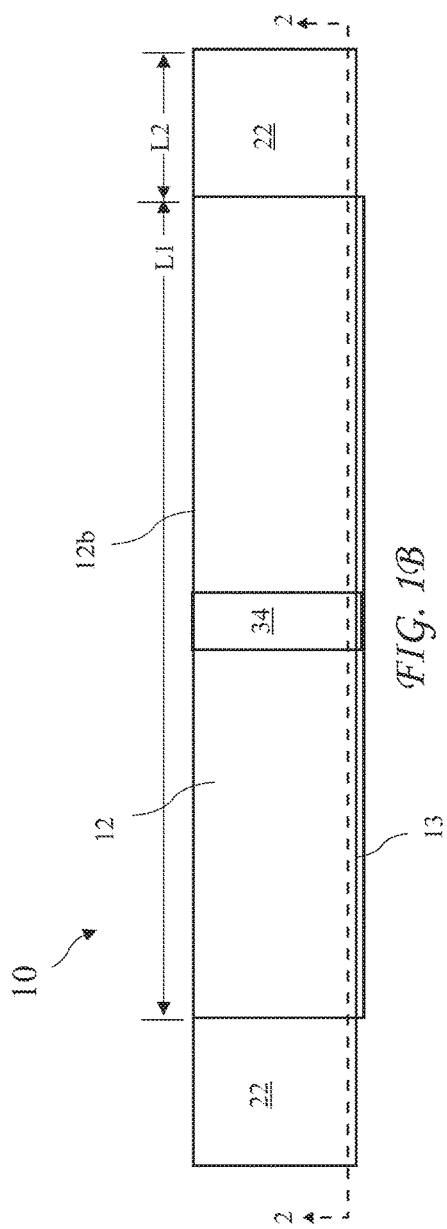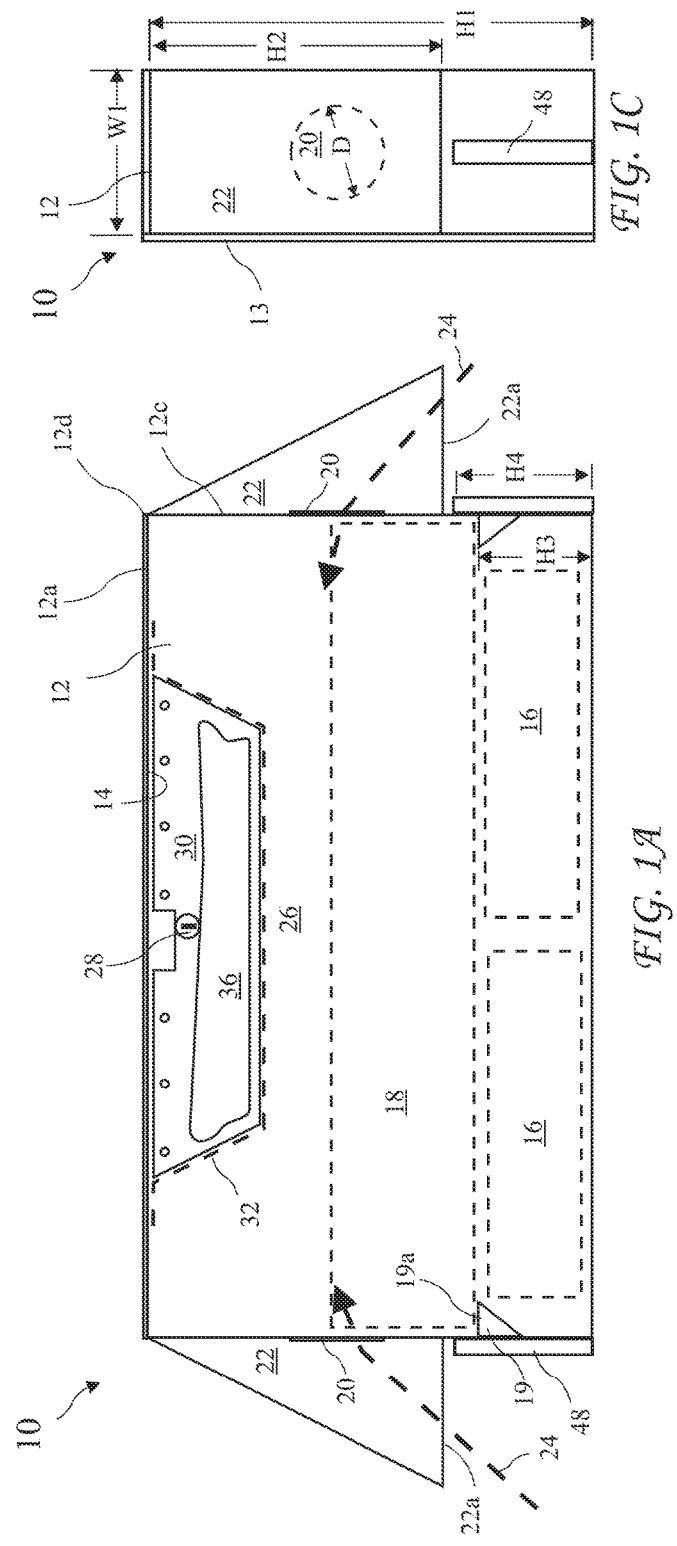

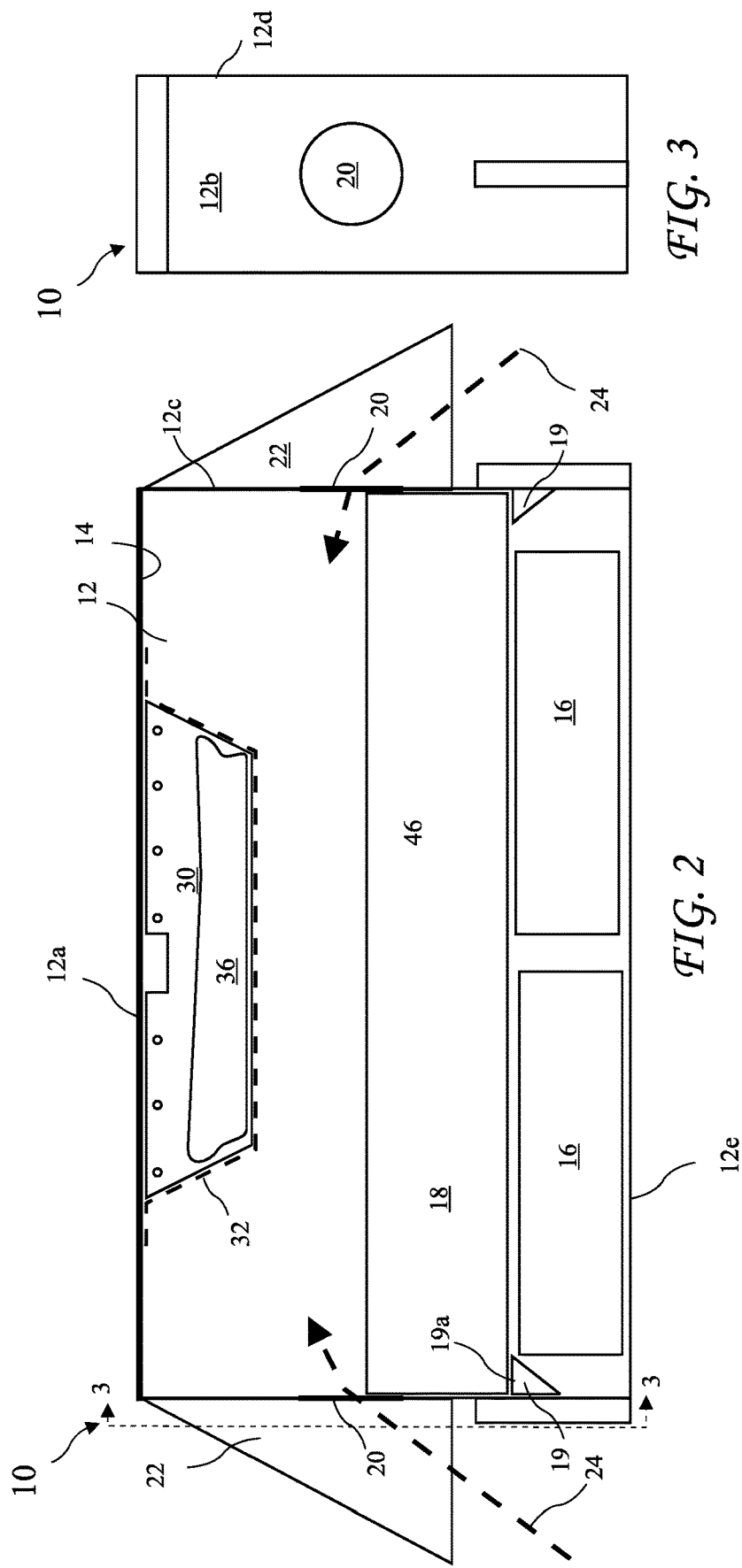

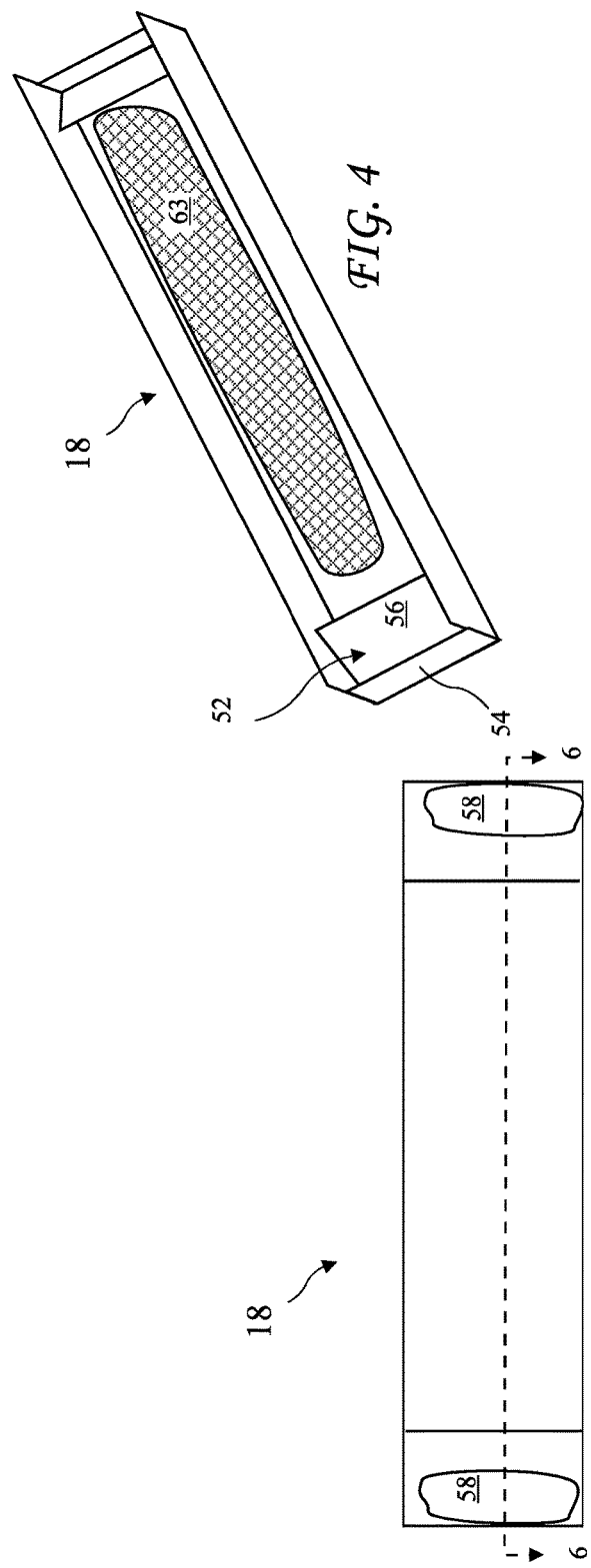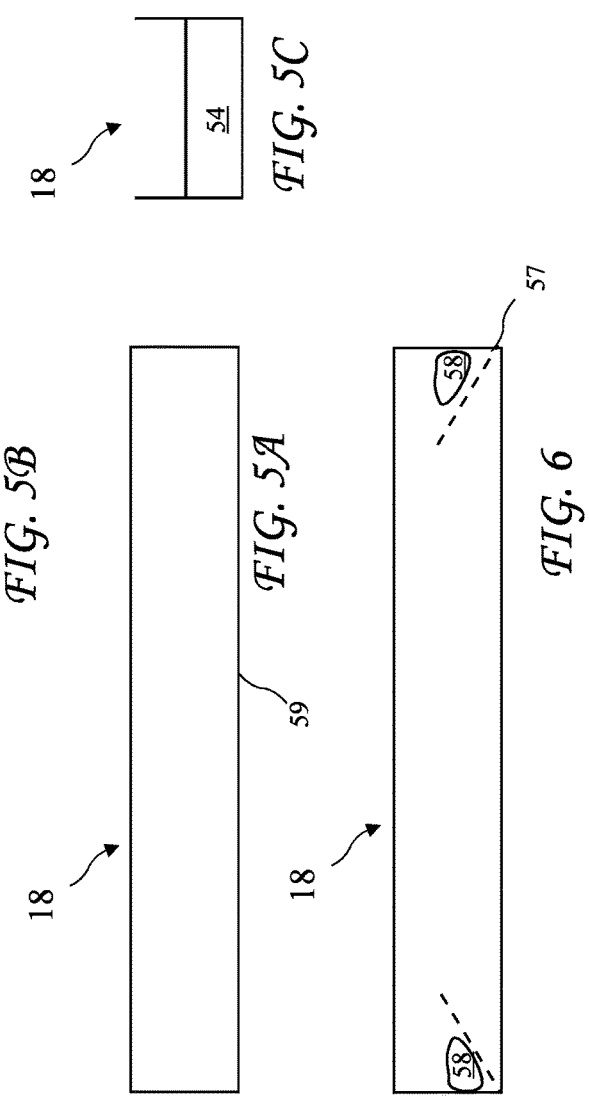

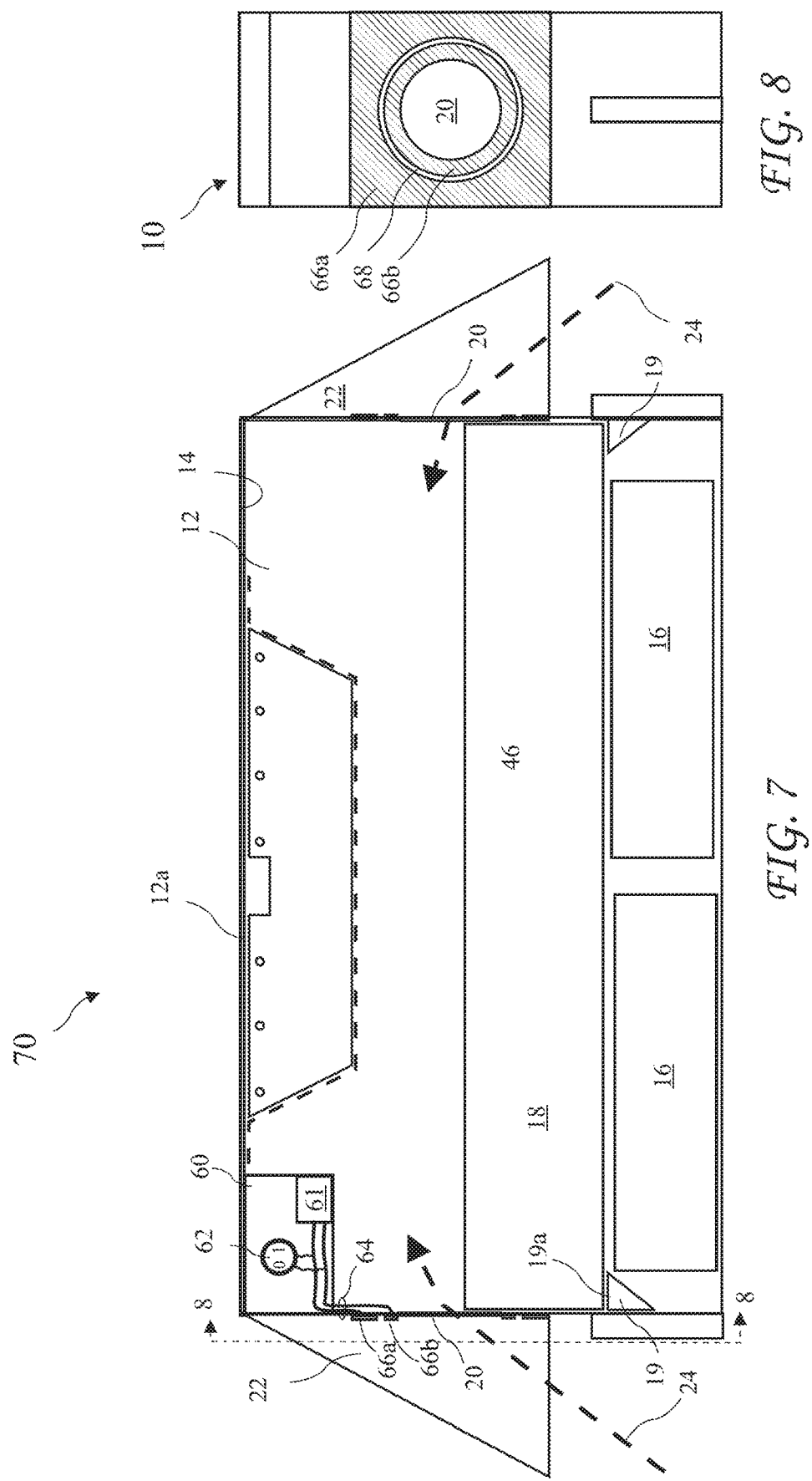

TRACKING POWDER POISON STATION

CROSS-REFERENCE TO RELATED APPLICATIONS

The present application is a Continuation In Part of U.S. patent application Ser. No. 16/374,957 filed Apr. 4, 2019, which application is incorporated in its entirety herein by reference.

BACKGROUND OF THE INVENTION

The present invention relates to pest extermination and in particular to a poison station containing tracking powder rodent poison.

Rodents damage property and remain a health hazard for both commercial and residential locations. Poison stations commonly contain rodent tracking powder. The rodent tracking powder contains a toxicant.

The tracking powder poison stations are utilized in areas open to humans and animals to avoid unintentional harm. The rodent tracking powder is isolated inside from human or animal contact inside the poison station. Unfortunately, known rodent bait stations have a number of weaknesses. Various creatures such as slugs, snails, crickets, etc. are able to enter the bait station and eat or contaminate the poison, and as a result, the rodent will no longer eat baits in the station again. Water may enter the bait station and damage the structure or baits. Ambient heat may also spoil the baits. Leaves and dust make the bait dirty, no longer attractive to rodent. As a result, a need remains for an improved bait station.

BRIEF SUMMARY OF THE INVENTION

The present invention addresses the above and other needs by providing a tracking powder poison station including a housing, rodent entrances, a removable or opening, lockable housing front, contamination guards above the rodent entrances into the housing, and a removable tray. A bottom portion of the housing provides space for common bricks arranged end to end. A center portion of the housing provides space for the removable tray. A top portion provides space for rodent attracting material. Tracking powder is deposited in the tray for contact with rodents. Insecticide is deposited in insecticide troughs at ends of the tray.

In accordance with one aspect of the invention, there is provided a poison station having a removable tray. The tray residing in the center portion supported by tray supports, the tray removable and simultaneously touching opposite interior ends of the housing, the tray including vertical tray end walls at ends of the tray and diagonal interior walls proximal to the tray end wall providing insecticide troughs between the tray end walls and the diagonal interior walls. Tracking powder is deposited in the tray to expose the tracking powder to rodents. The tray is preferably black to allow easy viewing of tracking powder.

In accordance with another aspect of the invention, there is provided a poison station having contamination guards residing over the rodent entrances. The contamination guards reaching down and out from a top edge of the housing above the rodent entrances, and reach down below the rodent entrances.

In accordance with another aspect of the invention, there is provided a poison station which may include a circuit including a 9 volts battery and a LED momentary rocker switch, which is used as a checker for battery power status.

Two spaced apart portions of electrically copper foil reside around the rodent entrance and are electrically connected to the circuit to resist entry of slugs and snails through the rodent entrances.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1A is a front view of a poison station according to the present invention.

FIG. 1B is a top view of the poison station according to the present invention.

FIG. 1C is a side view of the poison station according to the present invention.

FIG. 2 is a cross-sectional view of the poison station according to the present invention taken along line 2-2 of FIG. 1B.

FIG. 3 is a cross-sectional view of the poison station according to the present invention taken along line 3-3 of FIG. 2.

FIG. 4 is a three dimensional view of a poison station tray according to the present invention.

FIG. 5A is a front view of the poison station tray according to the present invention.

FIG. 5B is a top view of the poison station tray according to the present invention.

FIG. 5C is a side view of the poison station tray according to the present invention.

FIG. 6 is a cross-sectional view of the poison station tray according to the present invention taken along line 6-6 of FIG. 5B.

FIG. 7 is a cross-sectional view of a second poison station according to the present invention taken along line 2-2 of FIG. 1B.

FIG. 8 is a cross-sectional view of the second poison station according to the present invention taken along line 8-8 of FIG. 7.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

A front view of a poison station 10 according to the present invention is shown in FIG. 1A, a top view of the poison station 10 is shown in FIG. 1B, and a side view of the poison station 10 is shown in FIG. 1C. The poison station 10 has a center housing 12 and contamination guards 22 on each end 12c of the center housing 12 covering rodent entrances 20. The contamination guards 22 prevent or reduce entry of water, dust, leaves and non-target animals into the poison station 10. The contamination guards 22 taper out and down from a top edge 12d of the housing 12 and are open at their bottoms 22a. Posts 48 are attached generally centered to the ends of the housing 12 below the entrances 20. The posts 48 allow small mice to climb up easily into the poison station 10. A front 13 is preferably openable or removable to access an interior 26 of the poison station 10, and may be lockable by a tubular cam lock 28. Thermal insulation 14 extends the length and width of the top of the housing 12 to reduce heat entering the poison station 10. Weights 16 rest in the bottom of the housing 12, preferably common bricks. A scent cage 32 is attached to the housing top 12a and a scent tray 30 is supported by the scent cage 32. Scent material 36 (for example: peanut butter; bread; meat jerky strips; or the like) may be deposited into the scent tray 30 by removing the scent tray 30 when the front 13 is open, or by opening a door 34 in the housing top 13. A tray 18 resides in the interior 26 supported by tray supports 19 having top support surfaces 19a. The tray 18 is preferably black to allow easy viewing of tracking powder 63 (see FIG. 4).

The housing 12 and contamination guards 22 are preferably waterproof or water resistant material. The housing 12 has a height H1, a length L1, and a width W1. The height H1 is preferably about ten inches, the width W1 is preferably about four inches, and the length L1 is preferably about 18 inches. The contamination guards 22 have a height H2 of preferably about 6.75 inches. The tray supports reach a height H3 of preferably about 2.25 inches. The posts 48 have a height H4 of preferably about three inches. The rodent entrances 20 have a diameter D of about 2.25 inches. The weights 16 are preferably about eight inches long by four inches wide by 2.25 inches high.

A cross-sectional view of the poison station 10 taken along line 2-2 of FIG. 1B is shown in FIG. 2 and a cross-sectional view of the poison station 10 taken along line 3-3 of FIG. 2 is shown in FIG. 3. The housing 12 includes a top 12a, right side 12b, and left side 12c a rear 12d, and a bottom 12e.

A three dimensional view of the tray 18 is shown in FIG. 4, a front view of the tray 18 is shown in FIG. 5A, a top view of the tray 18 is shown in FIG. 5B, a side view of the poison station tray 18 is shown in FIG. 5C, and a cross-sectional view of the poison station tray 18 taken along line 6-6 of FIG. 5B is shown in FIG. 6. The tray 18 is about 18 inches long, four inches wide, and three inches high. The tray 18 alternatively has length and width to fit inside the housing 12 either touching or nearly touching interior sides and ends of the housing 12. Vertical tray end walls 54 at ends of the tray 18 reach up about to the lowest point of the entrances 20 (see FIG. 3). Diagonal interior walls 56 reach from bottom outside corners 57 of the tray 18 upward and inward and form insecticide troughs 52 holding insecticide 58. The insecticide kills crickets, earwigs, centipedes, millipedes, and the like which might enter the poison station 10 and reduce the number of rodents entering the poison station 10. The tray 18 further includes a tray bottom 59.

A cross-sectional view of a second poison station 70 taken along line 2-2 of FIG. 1B is shown in FIG. 7 and a cross-sectional view of the second poison station 70 taken along line 8-8 of FIG. 7 is shown in FIG. 8. The poison station 70 may include a circuit 60 having a battery 61 (preferably a common 9 volt battery) and a switch 62. The switch 62 may be a LED momentary rocker switch as a battery checker power status (see FIG. 7). The circuit 60 is connected to radially spaced apart copper foil conductors 66a and 66b surrounding the entrance 20 by leads 64. A gap 68 separated the foil conductors 66a and 66b. The voltage on the copper foil conductors 66a and 66b reduces slugs and snails entry into the housing 12. The poison station 70 is otherwise similar to the poison station 10.

While the invention herein disclosed has been described by means of specific embodiments and applications thereof, numerous modifications and variations could be made thereto by those skilled in the art without departing from the scope of the invention set forth in the claims.

I claim:

1. A tracking powder poison station, comprising:
   a housing having:
      a bottom portion of the interior configured to reside on a horizontal surface and to contain at least one weight;
      a top opposite to the bottom;
      a right side reaching up from the bottom to the top and attaching the top to the bottom;
      a left side reaching up from the bottom to the top and attaching the top to the bottom;
      a rear reaching up from the bottom to the top and attaching the top to the bottom;
      a front either openable or removable to access an interior having boundaries defined by the bottom, the top, the right side, the left side, the rear, and the front;
      a center portion of the interior above the bottom portion;
      a top portion of the interior above the center portion and configured to contain rodent attracting scent material;
      a scent tray residing in the top portion;
      at least one rodent entrance in an end of the housing overlapping the top portion of the interior; and
      a front either openable or removable to access the interior;
      a removable open top tray residing within the interior of the housing in the center portion, and the tray being removable from the housing through the front without disturbing the bottom, right side, the left side, the rear or the top of the housing and;
   wherein the housing is capable of holding a tracking powder.

2. The tracking powder poison station of claim 1, further including tray supports having top support surfaces for supporting the tray.

3. The tracking powder poison station of claim 2, wherein the top support surfaces are at or above the bottom portion of the interior.

4. The tracking powder poison station of claim 3, wherein the bottom portion of the interior is configured to locate the at least one weight below a bottom of the tray.

5. The tracking powder poison station of claim 4, wherein the at least one weight comprises two common size bricks arranged end to end.

6. The tracking powder poison station of claim 1, wherein the tray is removable and simultaneously touches opposite interior ends of the housing.

7. The tracking powder poison station of claim 1, wherein the tray includes at least one generally vertical end wall vertically overlapping the at least one rodent entrance.

8. The tracking powder poison station of claim 7, wherein the tray includes at least one interior wall proximal to the end wall providing an insecticide trough accessible through the at least one rodent entrance.

9. The tracking powder poison station of claim 8, wherein the at least one interior wall is diagonal and reaches upward and inward from a bottom corner of the tray.

10. The tracking powder poison station of claim 1, further including thermal insulation against a housing top.

11. The tracking powder poison station of claim 1, further including a scent cage residing in the interior attached to a housing top and configured to hold the scent tray.

12. The tracking powder poison station of claim 11, further including a door in the housing top above the scent tray allowing scent material to be directly deposited into the scent tray.

13. The tracking powder poison station of claim 1, further including at least one container guard residing over the at least one rodent entrance, the container guard reaching down and out from a top edge of the housing above the at least one rodent entrance.

14. The tracking powder poison station of claim 13, wherein the at least one container guard reaches down below the at least one rodent entrance.

15. The rodent poison station of claim 1, further including:
   a circuit having an electrical source; and
   two spaced apart portions of electrically conductive material around the at least one rodent entrance and electrically connected to the circuit,
   wherein the electrically conductive material is made of copper foil.

16. The tracking powder poison station of claim 1, posts attached to at least one end of the housing generally laterally centered and under the at least one rodent entrance.

17. A tracking powder poison station, comprising:
   a housing having:
      a bottom configured to reside on a horizontal surface;
      a top opposite to the bottom;
      a right side reaching up from the bottom to the top and attaching the top to the bottom;
      a left side reaching up from the bottom to the top and attaching the top to the bottom;
      a rear reaching up from the bottom to the top and attaching the top to the bottom;
      a front either openable or removable to access an interior having boundaries defined by the bottom, the top, the right side, the left side, the rear, and the front;
      a bottom portion of the interior configured to contain two common bricks residing end to end;
      a center portion of the interior above the bottom portion;
      a top portion of the interior above the center portions;
      thermal insulation against the housing top;
      a scent tray residing in the top portion;
      a door in the housing top aligned with the scent tray;
      two rodent entrances at opposite ends of the housing at least partially overlapping the top portion of the interior;
      tray supports having top support surfaces above the bottom portion; and
   contamination guards residing over the rodent entrances, the contamination guards reaching down and out from a top edges of the housing above the rodent entrances, the container guard reaches down below the rodent entrances;
   an open top tray residing in the center portion supported by the tray supports between the bottom, the right side, the left side, the rear and below the top, and removable from the housing through the front without disturbing the bottom, right side, the left side, the rear or the top of the housing, the tray simultaneously touching opposite interior ends of the housing, the tray including:
      vertical tray end walls at ends of the tray;
      diagonal interior walls proximal to the tray end wall reaching upward and inward from bottom end corners of the tray, the diagonal interior walls providing insecticide troughs between the tray end walls and the diagonal interior walls; and
   posts attached to at least one end of the housing generally laterally centered and under the rodent entrances and;
   wherein the housing is capable of holding a tracking powder.

18. A tracking powder poison station, comprising:
a housing having:
   a bottom configured to reside on a horizontal surface;
   a top opposite to the bottom;
   a right side reaching up from the bottom to the top and attaching the top to the bottom;
   a left side reaching up from the bottom to the top and attaching the top to the bottom;
   a rear reaching up from the bottom to the top and attaching the top to the bottom;
   a front either openable or removable to access an interior having boundaries defined by the bottom, the top, the right side, the left side, the rear, and the front;
   a bottom portion of the interior configured to contain two common bricks residing end to end;
   a center portion of the interior above the bottom portion;
   a top portion of the interior above the center portion and configured to contain bait blocks;
   thermal insulation against the housing top;
   two rodent entrances at opposite ends of the housing at least partially overlapping the top portion of the interior;
   a scent tray residing in the top portion and removable when the front is opened or removed;
   rodent attracting scent material residing in the scent tray;
   tray supports having top support surfaces above the bottom portion; and a front either openable or removable to access the interior;
contamination guards residing over the rodent entrances, the contamination guards reaching down and out from a top edge of the housing above the rodent entrances, the container guard reaches down below the rodent entrances;
an open top tray residing in the center portion supported by the tray supports between the bottom, the right side, the left side, the rear and below the top, and removable from the housing through the front without disturbing the bottom, right side, the left side, the rear or the top of the housing, the tray simultaneously touching opposite interior ends of the housing, the tray including:
vertical tray end walls at ends of the tray;
diagonal interior walls proximal to the tray end wall providing insecticide troughs between the tray end walls and the diagonal interior walls; tracking powder residing in the tray;
insecticide residing in the insecticide troughs;
posts attached to at least one end of the housing generally laterally centered and under the rodent entrances; and
wherein the housing is capable of holding a tracking powder.

* * * * *